(12) United States Patent
Fischer et al.

(10) Patent No.: US 8,433,589 B2
(45) Date of Patent: Apr. 30, 2013

(54) SYSTEM AND METHOD FOR PRICING AND ISSUING LEVEL PAY DEATH BENEFIT POLICIES

(75) Inventors: Paul M. Fischer, Avon, CT (US); Stephen A. Roche, Simsbury, CT (US); Michael J. Roscoe, South Windsor, CT (US); Mary Katherine Weise, Bloomfield, CT (US)

(73) Assignee: The Prudential Insurance Company of America, Newark, NJ (US)

( * ) Notice: Subject to any disclaimer, the term of this patent is extended or adjusted under 35 U.S.C. 154(b) by 690 days.

(21) Appl. No.: 12/640,653

(22) Filed: Dec. 17, 2009

(65) Prior Publication Data
US 2011/0153366 A1    Jun. 23, 2011

(51) Int. Cl.
*G06Q 40/00*    (2012.01)
(52) U.S. Cl.
USPC .................................. 705/4; 705/35; 705/36
(58) Field of Classification Search ................. 705/4, 35, 705/36
See application file for complete search history.

(56) References Cited

U.S. PATENT DOCUMENTS

| | | |
|---|---|---|
| 5,761,645 A | 6/1998 | Hawkins |
| 8,150,715 B1 * | 4/2012 | Yee et al. ........................... 705/4 |
| 2002/0091610 A1 * | 7/2002 | Smith .............................. 705/36 |
| 2003/0105691 A1 * | 6/2003 | Brown et al. ................... 705/35 |
| 2004/0199446 A1 | 10/2004 | Lange |
| 2007/0094053 A1 | 4/2007 | Samuels |
| 2008/0010095 A1 | 1/2008 | Joyce |
| 2008/0021744 A1 * | 1/2008 | Walker et al. ..................... 705/4 |
| 2008/0097797 A1 | 4/2008 | Morris et al. |
| 2008/0172260 A1 | 7/2008 | Thacker et al. |
| 2008/0275801 A1 | 11/2008 | Sanders et al. |

OTHER PUBLICATIONS

"Paycheck Term Insurance Worksheet", A-2768, 1992, ITT Life Insurance Corporation, 3pgs.
"Paycheck Term", A-2201-17, Mar. 1994, (pp. 1-23, total 23 pages).

* cited by examiner

*Primary Examiner* — Samica L Norman
(74) *Attorney, Agent, or Firm* — Baker Botts L.L.P.

(57) ABSTRACT

Pursuant to some embodiments, a computer system for pricing a paycheck term policy is provided which includes a processor, a communication device in communication with the processor the communication device configured to receive an input data set, the input data set including at least an issue age of an insured associated with the policy, a desired death benefit payment amount, an underwriting class associated with the insured, and an interest rate factor.

20 Claims, 9 Drawing Sheets

SYSTEM AND METHOD FOR PRICING AND ISSUING LEVEL PAY DEATH BENEFIT POLICIES

FIELD

The present invention relates to computerized pricing and issuance of level pay death benefit policies. More particularly, embodiments relate to computerized pricing and issuance of policies designed to provide a predetermined, periodic benefit amount upon death of an insured.

BACKGROUND

Typical life insurance policies provide a lump sum benefit upon the death of the insured. Unfortunately, it can be difficult to determine the appropriate amount of insurance benefit a wage earner may need to replace the wage-earner's stream of income. For example, a lump sum death benefit may be in excess of the amount needed if the insured dies close to or after retirement age, and may be less than the amount needed if the insured dies prior to retirement age. Purchasing too large of a policy adds extra and possibly unnecessary premium expense to the insured. Purchasing too small of a policy saves premium expense, but results in beneficiaries with too little replacement income.

Lump sum death benefits also require that the beneficiary properly manage the amount received. Many beneficiaries spend the benefit amount too quickly, leaving them without sufficient income to cover expenses. It would be desirable to remove or substantially reduce these uncertainties and provide beneficiaries with a known stream of income upon death of an insured.

The present inventors have recognized that paycheck replacement policies provide desirable benefits to insured and their beneficiaries and that computerized pricing and issuance of such policies can provide improved benefits to the insured, the beneficiary and the issuer.

BRIEF DESCRIPTION OF THE DRAWINGS

FIG. 4 is an outward view of an interface to obtain a quote using features of some embodiments.

FIG. 6 is an outward view of a further embodiment of an interface to obtain a quote using features of some embodiments.

FIG. 9 is an outward view of an interface providing a quote using features of some embodiments.

DETAILED DESCRIPTION

In general, and for the purposes of introducing concepts of embodiments of the present invention, a system and method for pricing and issuing level pay death benefit policies is provided (where the policies are generally referred to herein as "paycheck term" policies). Pursuant to some embodiments, the systems and methods price and issue policies which pay a predetermined monthly (or other regular) amount, selected by the insured at the issuance of the policy, in the event of death of the insured before a policy maturity date (e.g., such as the date the insured would turn 65). In some embodiments, a return of premium option may also be selected allowing the insured to receive an amount equal to the total of premiums paid in the event the insured does not die prior to the policy maturity date.

With these and other advantages and features of the invention that will become hereinafter apparent, the invention may be more clearly understood by reference to the following detailed description of the invention, the appended claims, and the drawings attached hereto.

Figure 1:
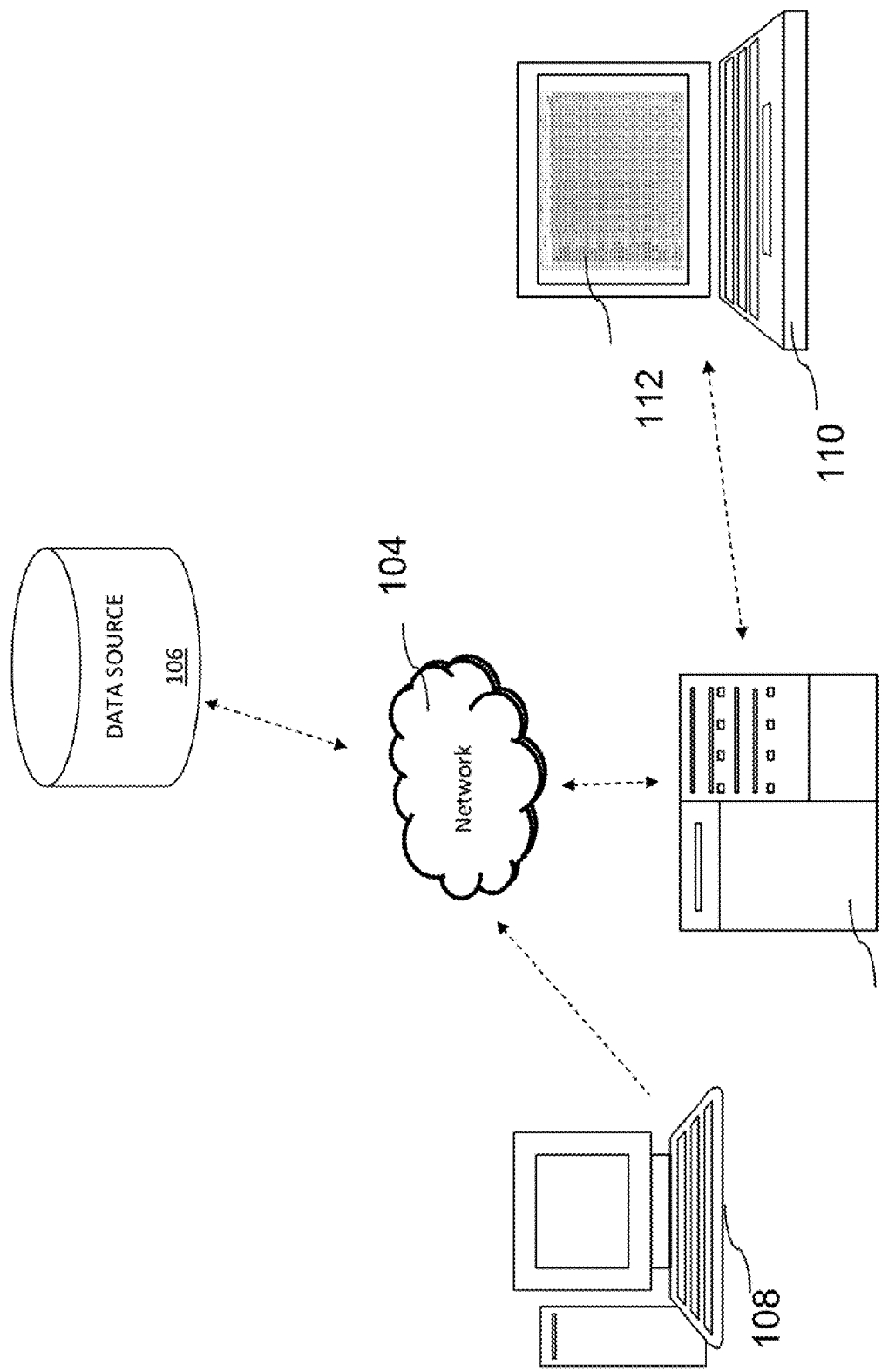
FIG. 1 is a block diagram of a system provided according to aspects of the present invention.

Pursuant to some embodiments, paycheck term policies are priced and issued using a computer system configured to allow fast, efficient and repeatable pricing, quoting and issuance of paycheck term policies. Reference is now made to FIG. 1 where a system for pricing and issuing paycheck term policies pursuant to some embodiments is shown.

FIG. 1 is a block diagram of a system 100 provided according to some embodiments of the present invention. The system 100 includes a computer 102 that may be operated by (or on behalf of) an insurance company to price and issue insurance policies in accordance with the present invention. The computer 102 will hereafter be referred to as the pricing and issuance computer 102. Pricing and issuance computer 102 may act as a Web server to receive policy requests from one or more requesting devices 108. Administrators may interact with pricing and issuance computer 102 using one or more administrator computers 110 which display formulas, data, and instructions on a display 112 for updating, editing and interaction by administrators including actuaries and others responsible for ensuring the pricing and issuance of policies is accomplished pursuant to the present invention. Further details of one embodiment of a pricing and issuance computer 102 will be provided below in conjunction with FIG. 2.

The pricing and issuance computer 102 is in communication with a number of other devices and systems over a communication network 104. The data communication network 104 may, for example, include one or both of a public data communication network such as the Internet and one or more private data communication networks (e.g., such as an Intranet or secured private network operated by or on behalf of an insurance company). Pricing and issuance computer 102 may be in communication with devices such as one or more data sources 106 and one or more requestor devices 108.

The data sources 106 may include data sources which are internal to an insurance company (such as the insurance company operating the pricing and issuance computer 102) and may include data such as data defining a plurality of underwriting classes, risk classes, or the like, that may be used in pricing and issuing policies pursuant to embodiments of the present invention. The data sources 106 may also include data sources that are external to the insurance company, such as, for example, publicly available data identifying cost of living data, interest rate data, or the like. Such data may be used by pricing and issuance computer 102 to price and issue policies pursuant to the present invention.

The requestor devices 108 may include computers configured to operate in a conventional manner to interact with pricing and issuance computer 102 to submit policy application data, to obtain pricing and quotes for new policies, and to view and otherwise interact with policies issued pursuant to embodiments of the present invention. Requestor devices 108 may comprise any suitable devices for requesting and displaying user interfaces, including but not limited to desktop computers, cell phones, personal digital assistants, and laptops. As will be described below, the interfaces may display policy rules and application data to allow a requestor (referred to herein as the "insured") to obtain pricing and to submit an application for a paycheck term policy pursuant to embodiments of the present invention.

Requestor devices 108 may be used to enter information into such interfaces and provide the information to another device (such as, for example, the pricing and issuance system 102). In some embodiments, requestor devices 108 are operated by insurance agents, customer service professionals of an insurer, and/or individuals shopping for insurance. Any number of requestor devices 108 may be employed according to some embodiments. Sample user interfaces that may be presented to insureds operating requestor devices 108 will be discussed further below in conjunction with FIGS. 4 and 5 (although those skilled in the art will appreciate that a wide variety of types and configurations of user interfaces may be presented).

In some embodiments, an application or request may be submitted via a telephone. For example, a prospective insured may call an agent other representative (such as an agent at a call center operated by or on behalf of an insurance company), and provide the application information to the agent or representative over the telephone. The agent or representative, operating a requestor device 108, may then enter the information into an interface (such as those discussed herein) to interact with pricing and issuance computer 102. In some embodiments, insureds may apply for and receive quotes and bind policies by submitting printed applications.

Figure 2:
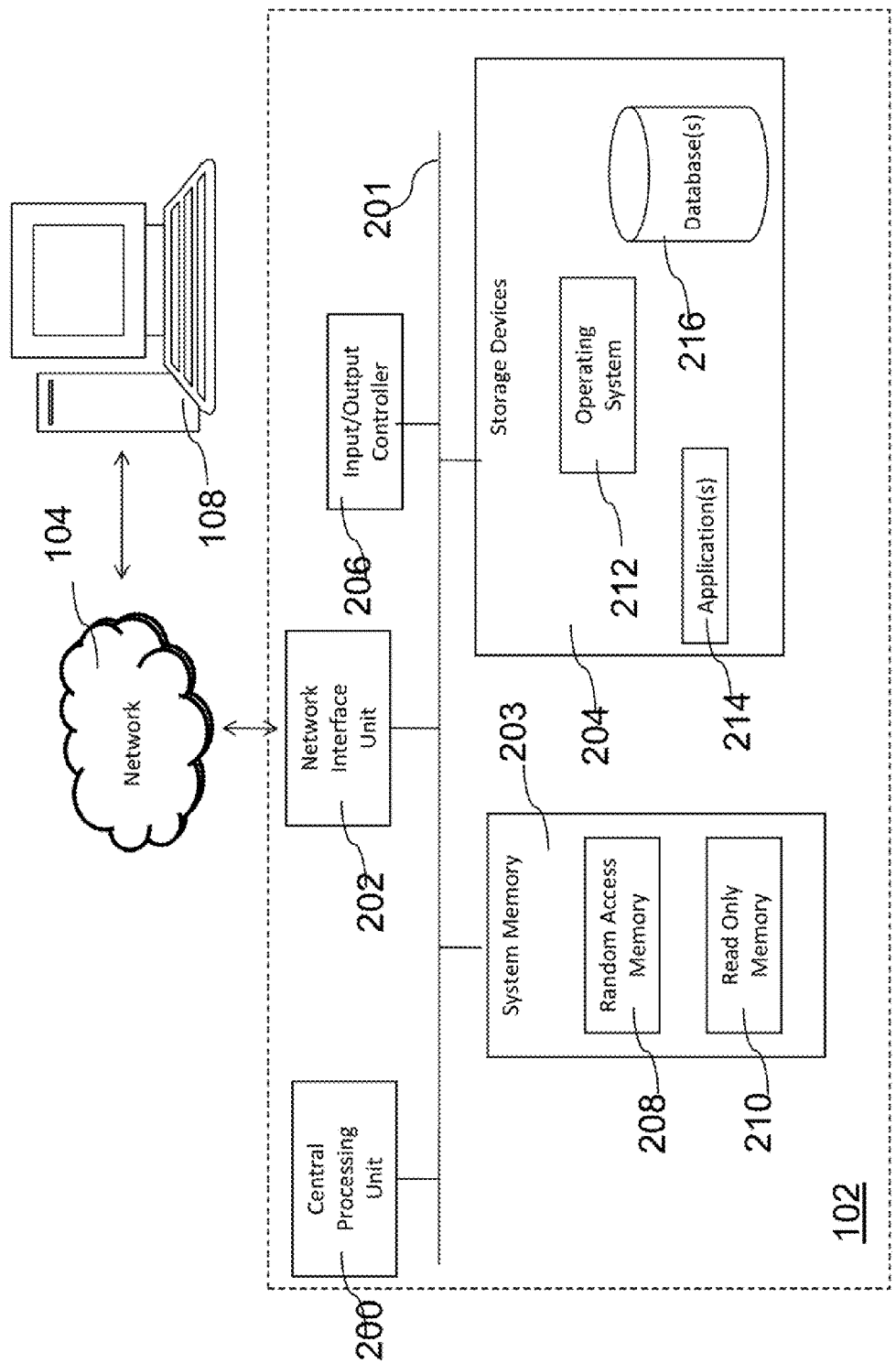
FIG. 2 is a block diagram representation of a computer that is part of the system of FIG. 1.

FIG. 2 is a block diagram representation of the pricing and issuance computer 102 shown in FIG. 1. The pricing and issuance computer 102 may be conventional in terms of its hardware aspects.

As depicted in FIG. 2, the pricing and issuance computer 102 includes a data bus 201. The pricing and issuance computer 102 also includes a computer processor (CPU) 200 which is operatively coupled to the data bus 201 and which may be constituted by one or more conventional processors. The pricing and issuance computer 102 further includes a network interface unit 202, system memory 203, one or more storage devices 204, and an input/output controller 206, all of which are also operatively coupled to the data bus 201.

The network interface unit 202 may function to facilitate communication with, for example, other devices (such as the requestor device(s) 108, administrator computer(s) 110 and data source(s) in FIG. 1). For example, the network interface unit 202 may allow communication between a broker (interacting with a user interface displayed on a requestor device 108) and the pricing and issuance computer 102 so that the broker can obtain a price quote on a paycheck term policy. As will be described further below, the broker (or other requestor, such as the insured interacting directly with a requestor device 108) may cause application data to be transmitted to the pricing and issuance computer 102 so that the pricing and issuance computer 102 may calculate a policy price (and generate other policy data) for a paycheck term policy for an individual requesting insurance coverage.

The input/output controller 206 may couple the pricing and issuance computer 102 to input and output devices (not shown) such as a keyboard, a keypad, a mouse or other pointing device, a microphone, knob or a switch, an infra-red (IR) port, a docking station, a touch screen, a display (e.g., a display screen), a speaker, and/or a printer.

The system memory 203 may be constituted by, for example a suitable combination of Random Access Memory (RAM) devices 208 and Read Only Memory (ROM) devices 210. Storage devices 204 may comprise any appropriate information storage device, including combinations of magnetic storage devices (e.g., magnetic tape and hard disk drives), optical storage devices, and/or semiconductor memory devices. At least some of these devices (and/or all or part of the system memory 203) may be considered computer-readable storage media, or may include such media.

Storage devices 204 stores one or more programs (at least some of which being indicated by blocks 212, 214) for controlling CPU 200. CPU 200 performs instructions of the programs, and thereby operates in accordance with aspects of the present invention. In some embodiments, the programs may include one or more conventional operating systems, indicated by block 212 in FIG. 2. The programs may further include application programs (block 214) such as a conventional data communication program and a conventional database management program. Still further the application programs may include software for pricing and issuing paycheck term insurance policies in accordance with aspects of the present invention. The application programs may include code to cause the CPU 200 to calculate the results of one or more pricing or underwriting formulas. For example, one or more application programs may be provided to cause the CPU 200 to perform a number of process steps to price and issue a paycheck term policy as shown in the process diagram of FIG. 3, discussed further below.

There may also be stored in the storage devices 204 other software, such as device drivers, website hosting software, etc. Still further, the storage devices 204 may store one or more databases 216 for storing and managing the data used in pricing and issuing paycheck term insurance policies as described below. Further, the databases 216 may include other databases that are utilized in the operation of the pricing and issuance computer 102.

In some embodiments, the pricing and issuance computer 102 may be formed as part of a larger insurance processing system. For example, the pricing and issuance computer 102 may be a component of an overall insurance underwriting and issuance system.

Figure 3:
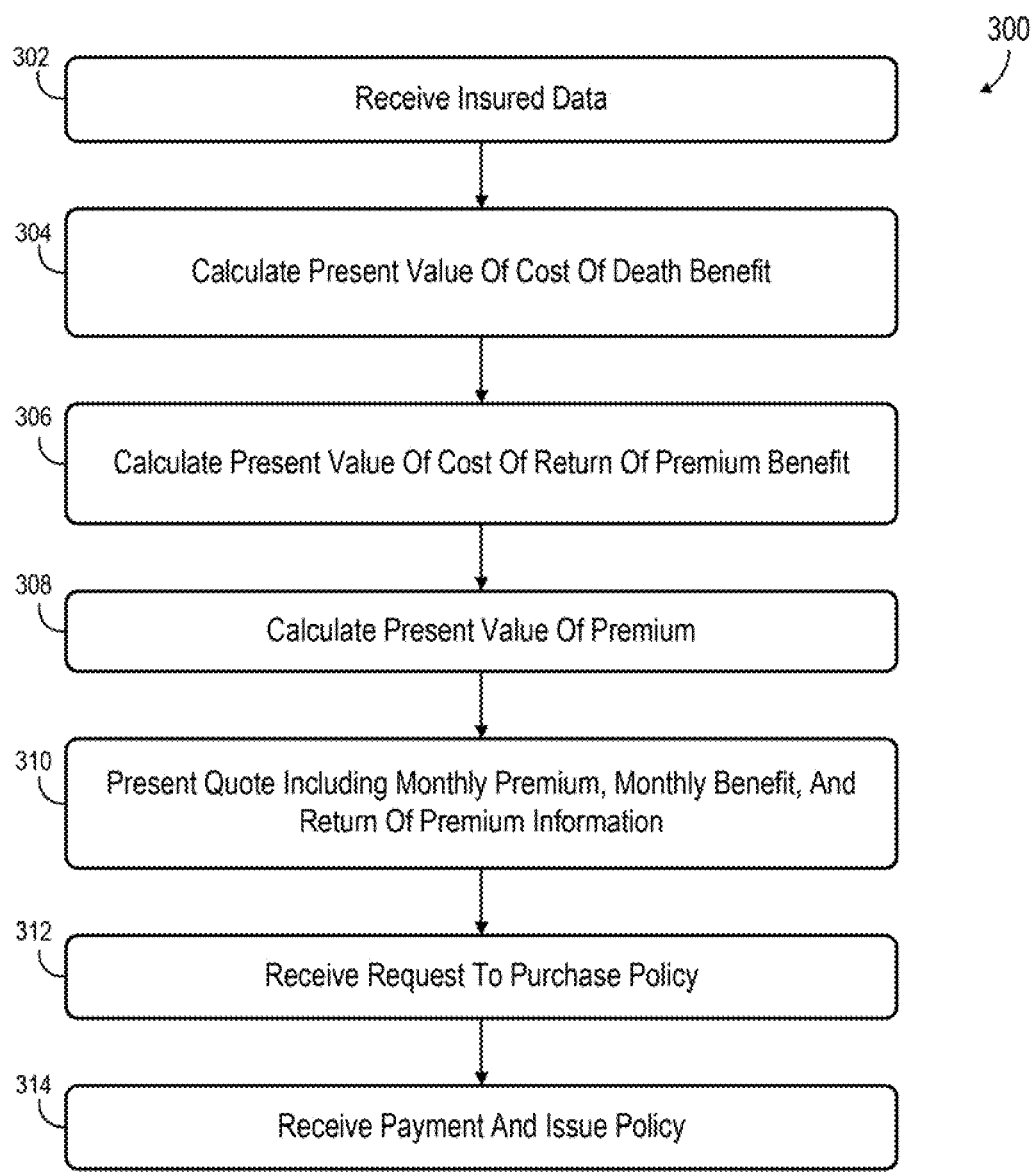
FIG. 3 is a flow chart that illustrates a process that may be performed in accordance with aspects of the present invention by the computer depicted in FIG. 2.

FIG. 3 is a flow chart that illustrates a process 300 that may be performed by the pricing and issuance computer 102 pursuant to some embodiments of the present invention. Various elements of the system 100 and/or computer system 102 may execute process 300 according to some embodiments. Process 300 may be embodied within program instructions of pricing and issuance computer 102, but embodiments are not limited thereto. Process 300 (and any other processes mentioned herein) may be embodied in processor-executable program instructions read from one or more computer-readable media, such as a floppy disk, a CD-ROM, a DVD-ROM, a magnetic tape, and then stored in a compressed, uncompiled and/or encrypted format. In some embodiments, hard-wired circuitry may be used in place of, or in combination with, program instructions for implementation of processes according to some embodiments. Embodiments are therefore not limited to any specific combination of hardware and software.

Process 300 begins at 302 where pricing and issuance computer 102 receives data about the insured. For example, the insured, or an agent of the insured (such as an insurance agent or broker), operates one of the requestor devices 108 to execute a Web browser or other direct interface. The insured (or agent thereof) manipulates a user interface to display an application form for a paycheck term policy. The application form may be presented with a number of instructions and a number of data entry fields to be completed by the insured. An example of a user interface that may be presented at 302 is shown and discussed below in conjunction with FIG. 4.

In general, the data entered at 302 includes the following: (i) information to identify the insured, such as name, address, etc., (ii) the applicant's current age and age at the time the policy will be issued, (iii) information to identify a risk class of the insured (including the insured's sex and health information), (iv) the insured's desired monthly benefit upon death (which may be the insured's current monthly salary, a cost of living adjusted salary, or some future expected salary amount as discussed further below), (v) a selection of whether the insured wishes to opt in to receive a return of premium if the insured survives a maturity date. Pursuant to some embodiments, the paycheck term policy application allows the insured to specify a monthly benefit payment amount the insured's beneficiaries are to receive in the event of the insured's early death (i.e., in the even the insured dies prior to the maturity date, or, as may be referred to herein, the "pay to" date). As a simple example, if the insured wishes to provide for a recurring monthly payment of $5,000 per month after his early death, then the insured can specify $5,000 as the desired monthly benefit upon death amount. The insured can also specify the "pay to" date which may be, for example, the date on which the insured expected to retire, the date on which the insured would have reached the age of 65, or some other date. This provides simple, predictable, and accurate death planning without the uncertainty involved in typical lump sum life insurance planning. The data entered by the insured (or agent) is posted or transmitted to the pricing and issuance computer 102 for processing.

Processing continues at 304 where the insured data is processed by the pricing and issuance computer 102 to calculate a present value of cost of death benefit. In some embodiments, the present value of cost of death benefit is calculated using an equation such as the equation shown as Equation 1, below.

$$PV(DB) = \sum_{t=x \times m}^{x \times m + N \times m} DB\_PMT(t)^{(m)} \times v^t \times (1 - {}_tp_x) \quad \text{(Eq. 1)}$$

Equation 1 includes the following variables that are used to allow the computation of a present value of the cost of a death benefit: "DB_PMT(t)$^{(m)}$" is the periodic death benefit payment amount, adjusted for any cost of living adjustments and inflation, "m" is the frequency of payments per year (typically 12, one for each month), "N" is the term of coverage in years (based on the insured's age at issue and the maturity date, typically when the insured turns 65 years of age), "x" is the insured's age at issue, "v" is the present value factor at time (t)", "${}_tp_x$" is the probability of survival of life from age "x" to age "x"+t. If sold as a universal life product rather than a term product, then the cost of the death benefit to the insurer would be the Net Amount at Risk (NAR). NAR=PV(DB)−AV. −"AV" is the account value, or the cash value of the policy at a given period of time.

Processing continues at 306 where the insured data is processed by the pricing and issuance computer 102 to calculate a present value of cost of return of premium benefit. In some embodiments, the present value of cost of cost of return of premium is calculated using an equation such as the equation shown as Equation 2, below.

$$PV(ROP) = {}_Np_x \times v^t \times \Sigma \text{premiums paid} \quad \text{(Eq. 2)}$$

Where the sum of the premiums paid over the life of the policy are multiplied by a probability of survival factor.

Processing continues at 308 where the insured data is processed by the pricing and issuance computer to calculate a present value of premium. In some embodiments, the present value of the premium is calculated using an equation such as the equation shown as Equation 3, below.

$$PV(PREM)=PV(DB)+PV(Profit)+PV(Expenses) \quad \text{(Eq. 3)}$$

Processing continues at 310 where the results of the calculations at 304-308 are used to construct a quote, including the monthly premium amount, the monthly benefit, and information about the return of premium to be paid to the insured if the insured survives past the maturity date.

Processing continues at 312 where a request is received to purchase or bind the policy. In some embodiments, a paycheck term policy pursuant to the present invention may be priced, quoted, and issued electronically. In situations where the insured wishes to bind or purchase the policy electronically, processing at 312 may include generating a policy including any applicable addendums or riders and presenting the full terms and conditions to the insured. In some embodiments, an electronic signature indicating acceptance of the terms by the insured (and any required co-signers or beneficiaries) may be obtained by prompting the insured to sign or indicate acceptance to a signature page displayed on the requestor device 108. In some embodiments, processing at 312 may include printing, signing, and/or mailing one or more signature pages to complete the binding of the policy.

Processing continues at 314 where payment for the policy is obtained. In some embodiments, processing at 314 may be performed electronically during the same session in which the quoting and acceptance of the policy terms was performed. For example, in some embodiments, processing at 314 includes prompting the insured to provide payment information, such as information identifying a bank account or other payment account to be debited for each monthly premium payment. Processing at 314 may also include issuing the final policy (electronically and/or by issuing a physical copy of the policy). In some embodiments, processing includes establishing an electronic account for the insured (and the insured's beneficiaries) so that the policy and related information may be accessed electronically. In some embodiments, the insured (and/or the insured's beneficiaries) can interact with the electronic account to change or update the policy. For example, in some embodiments, the insured (or beneficiaries) may be able to increase the monthly benefit amount by purchasing additional "units" or increments of benefits at a predetermined price.

To illustrate and describe features of some embodiments, an illustrative example will now be provided. In the illustrative example, an insured wishes to obtain a paycheck term policy quote and obtain a policy that provides a desired level term of insurance in the event of the insured's death. In the example, the insured is Mr. Tom Jones, who currently earns an annual salary of $60,000. His wife, Sally, earns $62,000 a year. Tom is a junior-level accountant. Both Tom and Sally are 28 years old and the couple has two young children. Tom and Sally want to be able to sustain their combined household incomes in the event that one of them dies, especially since both incomes are needed to fund the college savings and retirement income plans the couple has established. Because of these existing financial commitments, and their normal living expenses, the couple wishes to find an economical way to provide the security they need in the event of Tom or Sally's death before retirement age.

The couple, working with an insurance agent, decide to obtain pricing for a paycheck term policy pursuant to the present invention. The insurance agent operates a computer device (such as requestor device 108 of FIG. 1) to interact with the pricing and issuing computer 102. For example, the insurance agent may operate the requestor device 108 by launching an Internet browser and pointing the browser to a Web address associated with the pricing and issuing computer 102. After completing any required validation (e.g., such as entering a username and password or the like), the browser may display an initial data entry screen such as the data entry screen shown in FIG. 4.

Figure 4:
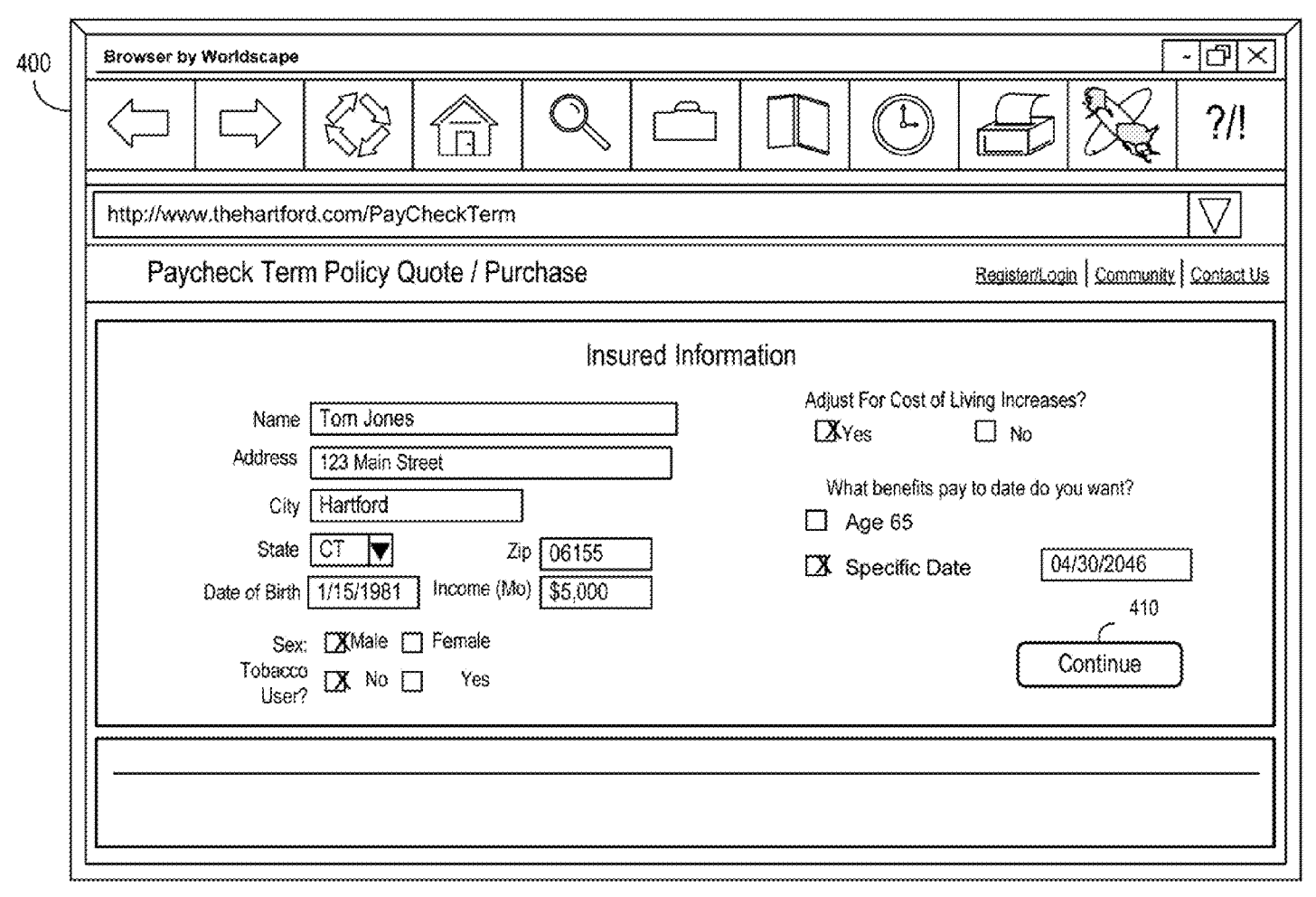

FIG. 4 is an outward view of a user interface 400 which may be used to provide applicant details to initiate a pricing or quoting process pursuant to some embodiments. Interface 400 includes labeled input boxes, some of which may include drop-down menus (e.g., such as the State of residence of the insured). However, those skilled in the art will recognize that any of a number of form field coding schemes may be used to ensure that data is entered in a reliable and consistent manner.

In the data entry screen 400, the insurance agent, insurance representative, or broker (or, in some embodiments, the insured, operating a requestor device 108 may directly enter information and receive a quotation) is prompted to enter several items of information to begin the paycheck term policy pricing process. For example, as shown, the insured is prompted to enter the insured's name, address, current age, and monthly income. In some embodiments, the insured may also be prompted to enter additional information such as the insured's profession, educational status, and information identifying any expected increases in income in the coming years. Other information may also be provided to ensure that the proper underwriting or risk class is used in pricing the policy (e.g., in some embodiments, information regarding the insured's medical condition or health profile may also be provided). Fields used to identify or associate the insured with a risk class may depend on the underwriting rules of the insurer. For example, in some embodiments, the risk classes may simply consist of: "Male, Non Smoker", "Male, Smoker", "Female, Non Smoker", "Female, Smoker". In other embodiments, more detailed information may be required to classify an insured into the appropriate risk class, including, for example, the results of medical tests (such as home urine tests, personal history interviews, blood profiles, physician exams, electrocardiograms, or the like).

The fields used on the data entry screen 400 may be split across multiple screens. In some embodiments, some data may be automatically populated from existing systems. For example, in the case where the insured is a current policy holder with the insurance company, address, age, and/or other fields may be automatically populated using Javascript or other scripting languages by pulling data from one or more databases).

A "continue" or "submit" button is provided which, when clicked, causes the form data to be posted to a posting acceptor associated with the pricing and issuance computer 102. Upon receipt of the form data, the pricing and issuance computer 102 operates to calculate a number of values associated with a paycheck term policy for the applicant. For example, as discussed above, the pricing and issuance computer 102 may calculate: (i) a present value of the cost of death benefit, (ii) a present value of cost of return of premium benefit, and (iii) a present value of the premium. This data may then be stored in a database associated with an application number for the draft policy so that it may be retrieved at a later time, or so that it may be used to issue a policy. The policy quote data is also provided to the Web browser of the requestor device 108 for viewing by the insurance broker or other operator of the requestor device 108.

Figure 9:
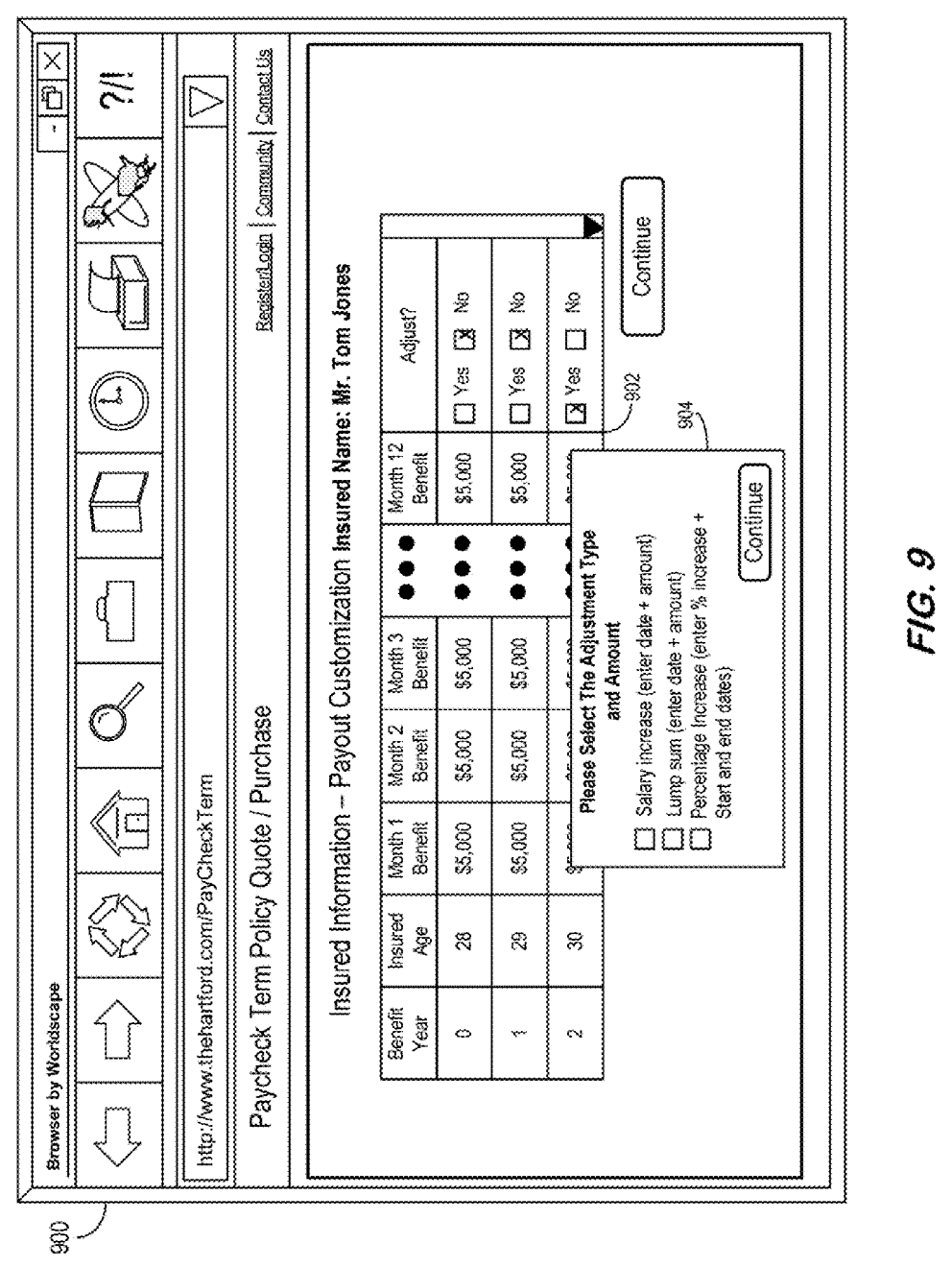

In some embodiments, which will be described by reference to the user interface 900 of FIG. 9, the insured may also specify one or more increases to his or her monthly benefit amount. For example, as shown in FIG. 9, a screen or other user interface may be presented to the insured (or an agent or broker working on behalf of the insured to complete the application), whereby the insured may customize the payout schedule associated with the paycheck term policy. For example, the user interface may display a schedule of expected payouts (based on the basic policy information entered, for example, at FIG. 4). In the illustrative example, Mr. Jones originally requested a $5,000 per month benefit (based on the objective of replacing his current salary at age 28). The payout customization screen allows insureds to build in future expected salary or bonus increases so that if the insured dies before the maturity of the policy, his beneficiaries can enjoy the expected increases.

In the sample user interface of FIG. 9, a pop up window 904 may be presented if a payout adjustment for any given policy year or policy month is selected. The window may prompt the insured (or an agent or broker of the insured) to select an adjustment type and an adjustment amount. For example, adjustment types may include: salary increases (which continue in subsequent months), one or more lump sum amounts (e.g., such as a future expected bonus or annual bonuses), a percentage increase (e.g., representing a annual salary increase or cost of living adjustment), or the like. The insured may be prompted to define the adjustment type, the adjustment amount, as well as the adjustment date and duration. This information is then transmitted to the pricing and issuance computer 102 to calculate an overall price of the policy. As an illustration, the calculation of the payout amount in such a scenario may be calculated as equal to the base payout amount (shown as the monthly benefits of FIG. 9) multiplied by (1+increase_amount(t)) plus the lump_sum(t). Those skilled in the art will recognize that other actuarial techniques may be used to factor in the cost of increases to provide an updated policy quote.

In some embodiments, the insured may also (or instead) be given the ability to customize or specify how the proceeds of the monthly benefits will be distributed in the event of a payout. In this manner, the proceeds of a paycheck term policy may more closely replace an insured's actual paycheck. For example, Mr. Tom Jones may contribute 10% of his monthly paycheck to a retirement savings account, and another 10% to a 529 plan (or the like). These payments may be taken directly from his paycheck, prior to distribution each month (e.g., as a direct payment by his employer). Mr. Jones (or his beneficiaries) may wish to continue those distributions upon his death. Embodiments of the present invention allow the insured to specify the distribution of monthly benefits, thereby ensuring the beneficiaries enjoy less disruption in their income and benefits in the event of early death of the insured. In some embodiments, the insured may update these distribution amounts and specifications during the term of the policy.

Figure 5:
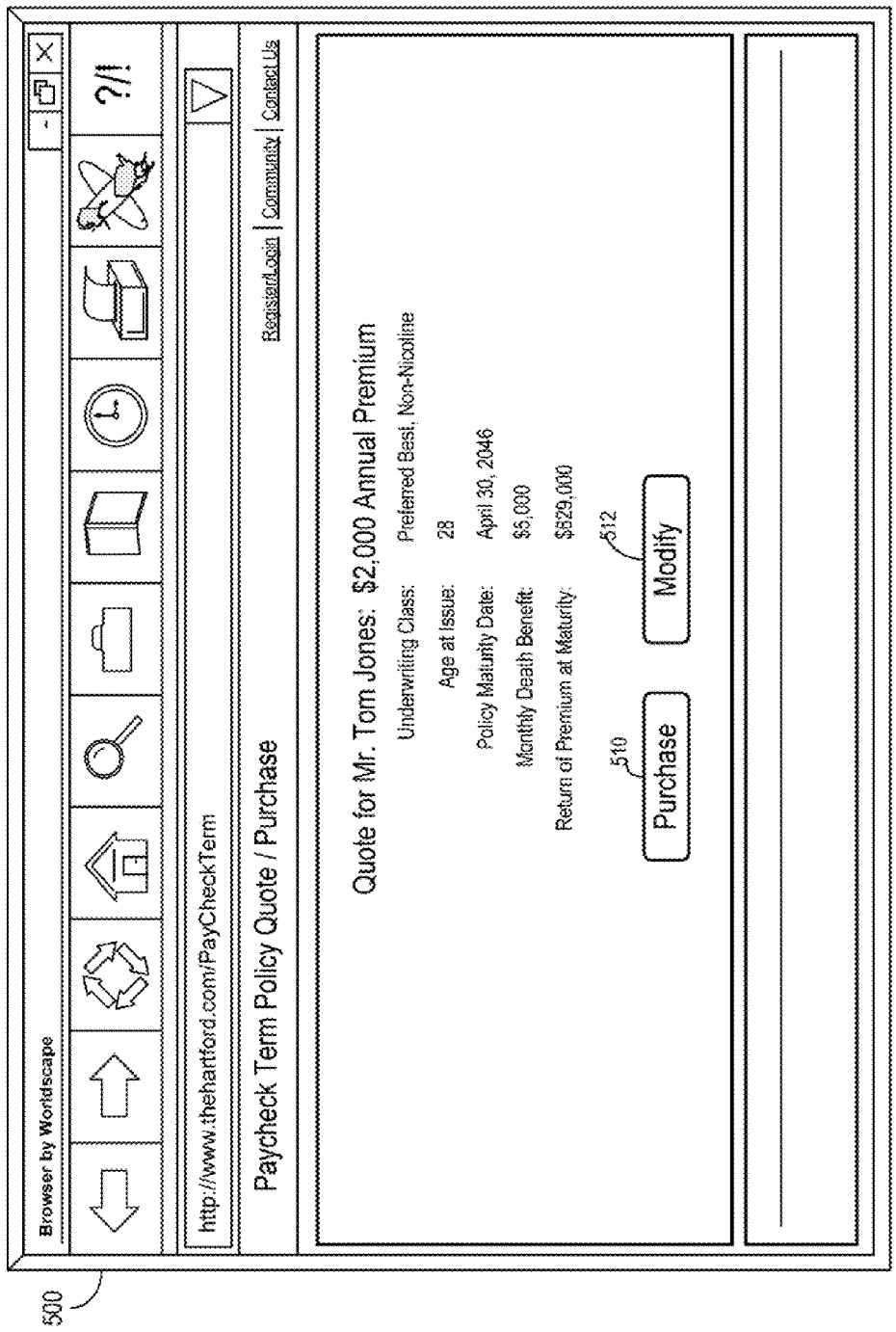
FIG. 5 is an outward view of an interface providing a quote using features of some embodiments.

A sample user interface showing the policy quote data is shown at FIG. 5. As shown, the policy quote data may be presented in a summary fashion with the basic policy details, including: the annual premium amount, the age at issue, the policy maturity date, the monthly death benefit, and the total return of premium to be paid at maturity if the insured survives the maturity date. Other details may also be provided, such as a full premium schedule, a draft contract for review by the insured, or the like.

In some embodiments, a button 510 may be provided so that the operator of the requestor device 108 may purchase or bind the policy based on the quoted terms. In some embodiments, the paycheck term policy may be purchased at this time. The operator of the requestor device 108 may also be given the option to modify one or more of the input parameters (e.g., to modify the size of the monthly death benefit, to decline the return of premium option, to add a future increase of benefits, etc.).

Continuing the illustrative example introduced above, the quote for the paycheck term policy for Tom Jones shows an annual premium of $2,000. If Tom wishes to bind this paycheck term policy, he may instruct the operator of the requestor device 108 (in the example, his insurance agent) to purchase the policy. The process may then be repeated for Sally Jones. In this manner, by purchasing a paycheck term policy with a $5,000 benefit per month, Sally (or the children) will receive a check every month for $5,000 in the event of Tom's death before he turns 65. The policy will provide the family with the ongoing income they need to pay their everyday living expenses, college education, and retirement expenses instead of a lump sum the family would have to carefully manage at death. In the event that Tom selects the return of premium option, the family would also enjoy the return of the sum of all paid premiums paid up to the time when Tom turns 65. Put another way, if Tom dies before he reaches age 65, the family enjoys a level term monthly payment. If Tom survives the age of 65, the family enjoys a lump sum payment equal to the sum total of all the premium payments made on the policy. The insured and his beneficiaries enjoy the security and predictability of a known monthly payment without the undesirable problems associated with certain life insurance policies.

Figure 6:
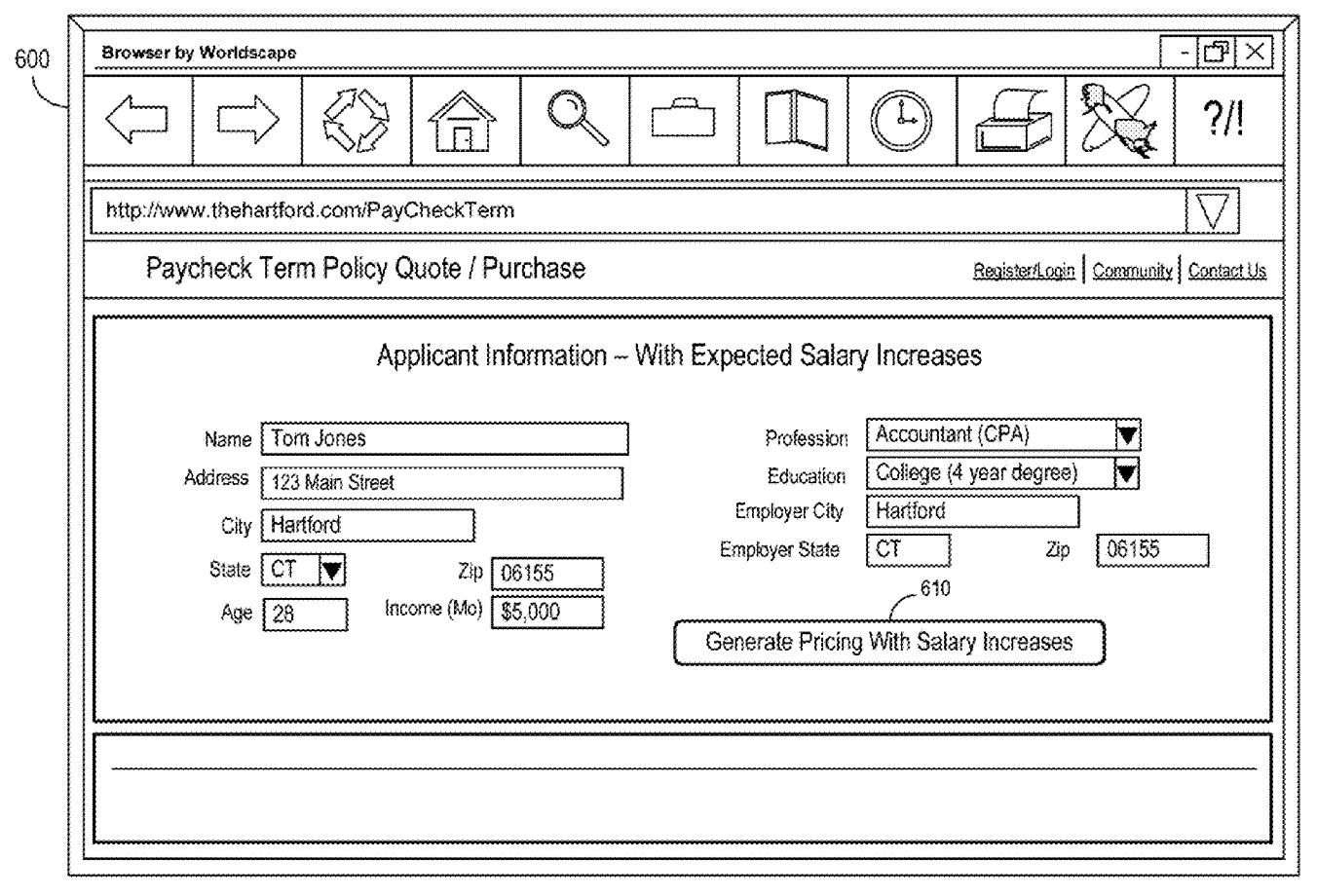

Pursuant to some embodiments, policies may be priced and issued with cost of living or salary increases built in to the initial policy. For example, referring now to FIG. 6, a sample input screen 600 is shown which may capture additional information about the prospective insured which may be used to build a price quote with periodic salary increases based on the insured's profession. In the sample input screen 600, data is provided about the insured (again, the data from the illustrative example introduced above is used) and the insured's current profession as well as the insured's educational and current employment information. This data may be used to obtain industry data about salary expectations for certain professions. In the illustrative example, Tom Jones is an accountant, and works in Hartford Conn. The pricing system may retrieve (from external data sources such as salary surveys, etc.) data estimating the salary increases a person in Tom's profession, with Tom's background and location, could expect. For example, in some embodiments, the salary data is used to construct salary increases every 10 years for Tom. The benefits schedule for Tom's policy can reflect those salary increases so that Tom's monthly death benefit more closely matches what Tom expects to make in the future. The salary increases are included in the pricing calculation so that the premiums charged reflect those increases.

Those skilled in the art will appreciate that other adjustments can be planned for as well, including increases at certain dates for expected expenses. For example, Tom may specify that he will need a total salary of $7,500 each month when he turns 55 to pay for expected additional expenses resulting from his children's education. As another example, Tom may specify that each year he expects a 10% bonus to be paid on his employment anniversary date. Embodiments of the present invention allow the pricing and issuance of policies which reflect such expected variations in benefit requirements.

Figure 7:
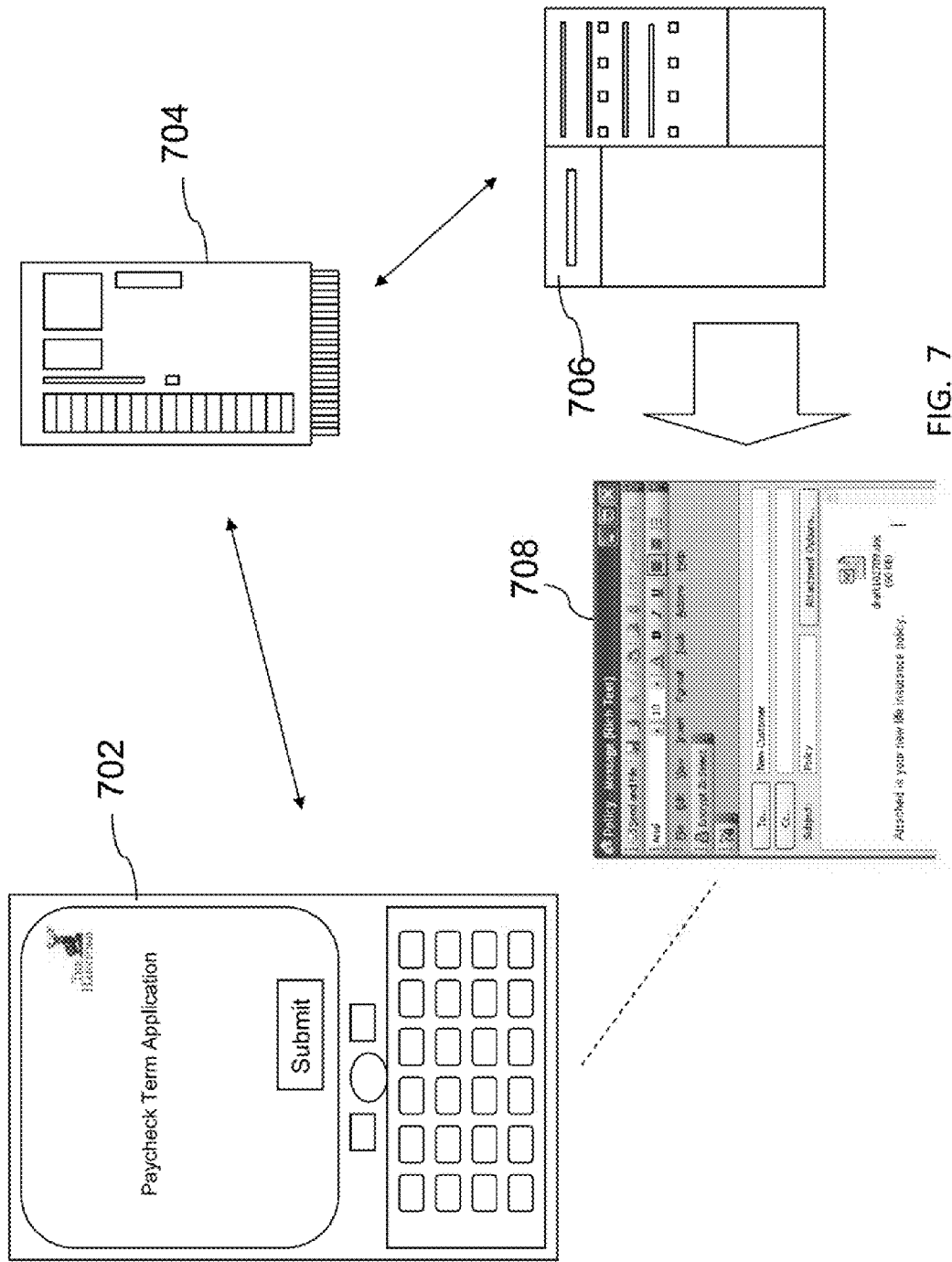
FIG. 7 is a block diagram representation of a further embodiment of a system pursuant to some embodiments.

Pursuant to some embodiments, applications may be received from a variety of different devices. For example, referring now to FIG. 7, paycheck term policies may be applied for using mobile or handheld devices such as the mobile device 702. The mobile device 702 may function as a requestor device 108 (as described above). In some embodiments, a separate or additional server 704 may be used to serve Web pages that are viewable on mobile devices. For example, server 704 may be a Windows® or Linux Web server that serves Web pages that are readable by mobile devices such as mobile telephones, PDAs or the like. The Web pages may include pages similar to those described above in conjunction with FIGS. 4-6. Data received from a mobile device 702 may then be posted from the Web server to a pricing and issuance server 706 (which may generally correspond to the pricing and issuance computer 102 of FIG. 1). Upon issuance of a paycheck term policy, in some embodiments, a policy may be presented to the insured by email (such as email 708), by storing a Web accessible copy of the policy in a secure area of Web server 704, or by mailing a copy of the policy to the insured. A similar configuration may also be used in conjunction with desktop or other computers configured to operate as requestor devices 108.

Figure 8:
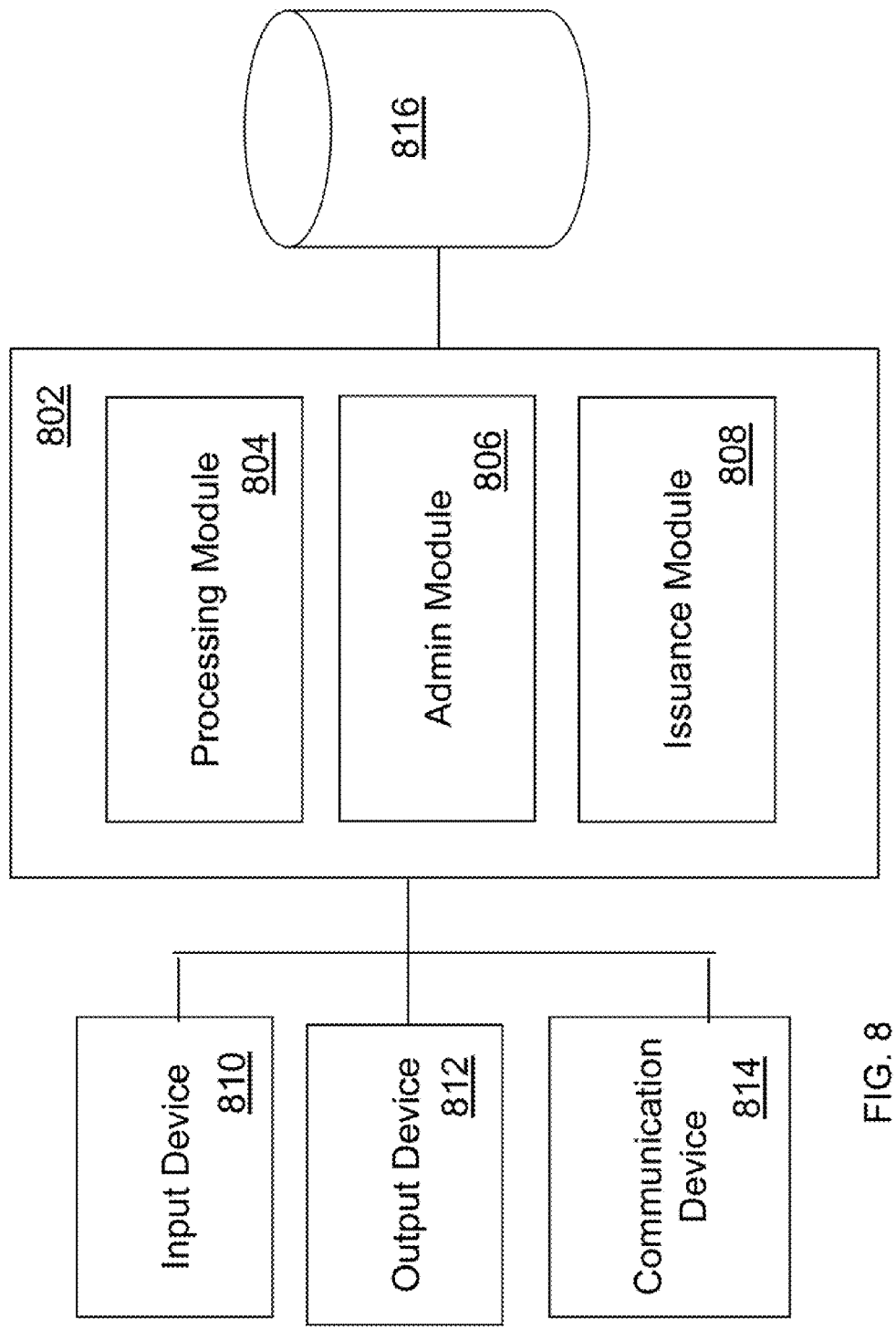
FIG. 8 is a block diagram representation of a pricing and issuance server according to some embodiments.

Reference is now made to FIG. 8, where functional components of pricing and issuance server 802 are shown (generally corresponding to the components of pricing and issuance computer 102 of FIG. 1). As depicted, server 802 includes a number of components and modules configured to allow the pricing and issuance of paycheck term policies pursuant to the present invention. Server 802 includes, for example, a processing module 804 including one or more processing units and software scripts, macros, routines, algorithms or the like configured to operate on input data received from a requestor device 108 via a communication device 814. For example, the processing module 804 may store code configured to apply one or more of the equations shown above in conjunction with the description of FIG. 3 to calculate premiums for a particular paycheck term policy. Processing module 804 may generate the pricing and quote data that is then presented to the insured for approval and acceptance by transmitting data via the communication device 814 to the requestor device.

Server 802 also includes an administration module 806 which includes software scripts, macros, routines, algorithms or the like configured to allow administration of rules, formulas and procedures to allow the pricing, underwriting and issuance of policies pursuant to the present invention. In some embodiments, administrators may interact with module 806 through I/O devices, including one or more input devices 810 and output devices 812.

Server 802 also includes an issuance module 808 which includes software, scripts, macros, routines, algorithms or the like configured to allow the issuance of paycheck term policies pursuant to the present invention. In some embodiments, the issuance module 808 includes a payment module to process payments and establish payment schedules for premium payments for policies issued pursuant to the present invention.

Processes portrayed herein as being performed by one computer may in practice be divided among two or more computers. Processes portrayed herein as being performed by two or more computers may in practice be performed by a single computer. For example, the pricing and issuance computer 706 and the Web server 704 of FIG. 7 may be integrated together as a single computer.

The process descriptions and flow charts contained herein should not be considered to imply a fixed order for performing process steps. Rather, process steps may be performed in any order that is practicable.

As used herein and in the appended claims, the term "computer" refers to a single computer or to two or more computers in communication with each other and/or operated by a single entity or by two or more entities that are partly or entirely under common ownership and/or control. As used herein and in the appended claims, the term "processor" refers to one processor or two or more processors that are in communication with each other. As used herein and in the appended claims, the term "memory" refers to one, two or more memory and/or data storage devices.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer system for pricing a paycheck term policy, the computer system comprising:
   a processor;
   a communication device in communication with the processor and receiving an input data set, said input data set including at least an issue age of an insured associated with said policy, a desired death benefit payment amount, an underwriting class associated with said insured, and an interest rate factor;
   a memory in communication with the processor and storing program instructions, the processor operative with the program instructions to
      store a first equation, said first equation defining a present value of cost of death benefit in terms of a plurality of independent variables including the desired death benefit payment amount, a fixed annuity factor, an account value, a present value factor, a probability of survival, and a probability of death;
      store a second equation, said second equation defining a present value of a premium in terms of a plurality of independent variables including said present value factor, said probability of survival factor, said desired death benefit payment amount, said fixed annuity factor, said account value, and said probability of death;
      store a third equation, said third equation defining a present value of a cost of return of premium benefit in terms of a plurality of independent variables including a probability of life factor, and a total of premiums paid at a benefit year;
      apply said first and second equation to said input data set to generate a pricing dataset for said paycheck term policy, said pricing dataset including at least a present value of a premium and a present value of cost of death benefit;
      apply said third equation to said output of said second equation to generate a present value of a cost of return of premium benefit; and
      output said pricing dataset.

2. The computer system of claim 1, said input data set further including a requested future benefit increase amount and said pricing dataset further including a premium increase amount based on said requested future benefit increase amount.

3. The computer system of claim 2, wherein said requested future benefit increase amount is automatically calculated based on an estimated salary expectation of said insured.

4. The computer system of claim 3, wherein said requested future benefit increase amount is selected by said insured.

5. The computer system of claim 3, wherein said estimated salary expectation of said insured is estimated based on information identifying at least one of: an education, a profession, and a geographical location of said insured.

6. The computer system of claim 1, said input data set further including a plurality of requested future benefit increase amounts, and said pricing dataset further including at least a first premium increase amount based on said plurality of requested future benefit increase amounts.

7. The computer system of claim 1, wherein said probability of death is identified based on an underwriting class associated with said insured.

8. The computer system of claim 7, wherein said underwriting class is selected from at least one of: a male smoker, a male nonsmoker, a female smoker, and a female nonsmoker.

9. The computer system of claim 1, wherein said processor is further operative with the program instructions to:
   receive a request to purchase said paycheck term policy.

10. The computer system of claim 9, wherein said processor is further operative with the program instructions to:
    receive payment instructions for payment for said paycheck term policy.

11. The computer system of claim 9, wherein said processor is further operative with the program instructions to:
    generate a policy for signature by said insured; and
    present said policy for signature by said insured.

12. A method for operating a server to issue a paycheck term policy, the method comprising:
    receiving, from a remote requestor device, application data for a paycheck term policy, the application data including (i) information identifying an insured, (ii) information identifying an age of said insured, (iii) information identifying a risk class of said insured, and (iv) information identifying a desired monthly death benefit;
    calculating a present value of a cost of a death benefit;
    calculating a present value of a cost of return of premium benefit;
    calculating a present value of a premium;
    transmitting, to said remote requestor device, a quotation for said paycheck term policy, said quotation including information specifying (i) a monthly premium amount, (ii) a monthly death benefit amount, and (iii) a return of premium amount; and
    receiving, from said remote requestor device, a request to purchase said paycheck term policy based on said quotation.

13. The method of claim 12, further comprising:
    receiving, from said remote requestor device, payment information for payment of at least a first premium amount associated with said paycheck term policy.

14. The method of claim 12, further comprising:
    transmitting, to said remote requestor device, an electronic version of said paycheck term policy; and
    receiving, from said remote requestor device, an electronic signature of said insured representing said insured's acceptance of said quotation.

15. The method of claim 12, wherein said application data further comprises information identifying at least a first monthly benefit increase amount, said quotation for said paycheck term policy including said at least first monthly benefit increase amount.

16. The method of claim 15, wherein said first monthly benefit increase amount is selected by said insured.

17. The method of claim 15, wherein said information identifying said at least a first monthly benefit increase amount includes information specifying a desired increase amount and a desired increase date.

18. The method of claim 12, wherein said application data further includes a plurality of monthly benefit increase amounts, and wherein said calculating a present value of said premium further comprises:
   calculating based on said plurality of monthly benefit increase amounts to determine the present value of said premium.

19. The method of claim 12, wherein said application data further comprises information identifying an occupation of said insured and a request to increase said monthly benefit amount based on an estimated salary associated with said occupation.

20. The method of claim 19, further comprising:
   calculating, based on said occupation of said insured, an estimated salary increase associated with said occupation, wherein said quotation for said paycheck term policy includes a monthly benefit increase amount based on said estimated salary increase.

* * * * *